United States Patent
Nakura et al.

(10) Patent No.: US 9,179,027 B2
(45) Date of Patent: Nov. 3, 2015

(54) IMAGE FORMING APPARATUS FOR IMPROVING ACCURACY IN ALIGNMENT OF AN IMAGE TO BE PRINTED ON TWO SURFACES OF A RECORDING MEDIUM BY MEASURING A SIZE OF THE RECORDING MEDIUM

(71) Applicants: Makoto Nakura, Ibaraki (JP); Naoto Ueda, Ibaraki (JP); Shingo Takai, Ibaraki (JP); Satoshi Ueda, Ibaraki (JP)

(72) Inventors: Makoto Nakura, Ibaraki (JP); Naoto Ueda, Ibaraki (JP); Shingo Takai, Ibaraki (JP); Satoshi Ueda, Ibaraki (JP)

(73) Assignee: RICOH COMPANY, LTD., Tokyo (JP)

(*) Notice: Subject to any disclaimer, the term of this patent is extended or adjusted under 35 U.S.C. 154(b) by 70 days.

(21) Appl. No.: 14/059,823

(22) Filed: Oct. 22, 2013

(65) Prior Publication Data

US 2014/0118762 A1 May 1, 2014

(30) Foreign Application Priority Data

Oct. 31, 2012 (JP) ................. 2012-240827

(51) Int. Cl.
| | |
|---|---|
| *G06K 15/16* | (2006.01) |
| *H04N 1/00* | (2006.01) |
| *G06K 15/02* | (2006.01) |
| *G03G 15/00* | (2006.01) |
| *B65H 7/02* | (2006.01) |

(52) U.S. Cl.
CPC ....... *H04N 1/00748* (2013.01); *G03G 15/5029* (2013.01); *G06K 15/1868* (2013.01); *H04N 1/0071* (2013.01); *H04N 1/00578* (2013.01); *H04N 1/00594* (2013.01); *H04N 1/00734* (2013.01); *H04N 1/00779* (2013.01); *G03G 2215/00734* (2013.01); *G03G 2215/0129* (2013.01)

(58) Field of Classification Search
None
See application file for complete search history.

(56) References Cited

U.S. PATENT DOCUMENTS

| 8,014,701 B2 | 9/2011 | Nakura et al. |
| 8,023,872 B2 | 9/2011 | Tao et al. |
| 8,086,156 B2 | 12/2011 | Tao et al. |
| 8,095,056 B2 | 1/2012 | Mikajiri et al. |
| 8,160,482 B2 | 4/2012 | Nakura |
| 8,213,834 B2 | 7/2012 | Takai et al. |

(Continued)

FOREIGN PATENT DOCUMENTS

| JP | 2004-045476 | * 2/2004 | ............ G03G 21/00 |
| JP | 2004-129069 | 4/2004 | |

(Continued)

*Primary Examiner* — Barbara Reinier
*Assistant Examiner* — Pawandeep Dhingra
(74) *Attorney, Agent, or Firm* — Oblon, McClelland, Maier & Neustadt, L.L.P.

(57) ABSTRACT

An image forming apparatus includes an image forming unit to form an image on a recording medium; an inverting transport unit to invert first and second surfaces of the recording medium, and front and rear ends of the recording medium to transport the inverted recording medium; a recording medium width measuring unit to measure an end position of the recording medium in a width direction orthogonal to a transporting direction of the recording medium at a measuring position having an approximately identical distance from one end of the recording medium in the transporting direction before and after the image is formed on the recording medium; and a correcting unit to correct an image to be formed on a subsequent recording medium based on a change in a shape of the recording medium computed based on a measured result from the recording medium width measuring unit.

11 Claims, 10 Drawing Sheets

(56) References Cited

U.S. PATENT DOCUMENTS

| | | | |
|---|---|---|---|
| 8,238,793 B2 | 8/2012 | Nakura et al. | |
| 8,391,759 B2 | 3/2013 | Nakura | |
| 8,515,310 B2 | 8/2013 | Nakura et al. | |
| 2008/0067739 A1* | 3/2008 | Katayama | 271/264 |
| 2012/0081445 A1* | 4/2012 | Tanahashi | 347/16 |
| 2012/0087703 A1 | 4/2012 | Takai et al. | |
| 2012/0141147 A1* | 6/2012 | Furuya et al. | 399/16 |
| 2012/0257915 A1 | 10/2012 | Nakura et al. | |
| 2012/0263497 A1 | 10/2012 | Nakura et al. | |
| 2013/0003134 A1* | 1/2013 | Hazu et al. | 358/448 |
| 2013/0049287 A1* | 2/2013 | Ueda et al. | 271/110 |
| 2013/0049296 A1* | 2/2013 | Takai et al. | 271/227 |
| 2013/0195482 A1* | 8/2013 | Nakura et al. | 399/45 |
| 2013/0228969 A1* | 9/2013 | Nakura et al. | 271/272 |
| 2014/0029961 A1* | 1/2014 | Ueda et al. | 399/16 |
| 2014/0037299 A1* | 2/2014 | Nakura et al. | 399/16 |

FOREIGN PATENT DOCUMENTS

| | | | | |
|---|---|---|---|---|
| JP | 2004-271739 | * | 9/2004 | G03G 21/00 |
| JP | 2004-347842 | | 12/2004 | |
| JP | 2006-078927 | * | 3/2006 | G03G 21/00 |
| JP | 2007-072094 | | 3/2007 | |
| JP | 2007-079262 | | 3/2007 | |
| JP | 4227367 | | 2/2009 | |
| JP | 2011-043533 | * | 3/2011 | G03G 15/01 |

* cited by examiner

IMAGE FORMING APPARATUS FOR IMPROVING ACCURACY IN ALIGNMENT OF AN IMAGE TO BE PRINTED ON TWO SURFACES OF A RECORDING MEDIUM BY MEASURING A SIZE OF THE RECORDING MEDIUM

BACKGROUND OF THE INVENTION

1. Field of the Invention

The disclosures discussed herein relate to an image forming apparatus.

2. Description of the Related Art

In the commercial printing industry, a printing technology called "Print On Demand" (POD) has become popular for printing small lots and various variable data along with progress in shifting from a offset printing press to an image forming apparatus employing an electrophotographic system and the like. Since such an image forming apparatus employing an electrophotographic system meets a wide variety of needs as described above, accuracy in alignment of two surfaces, uniformity of images comparable to those provided by the offset printing press, and the like may increasingly be required.

Factors of misalignment of two surfaces may be roughly divided into a) registration errors in a vertical direction and a horizontal directions; b) a skew error between a recording medium and a printing image; and c) image length expansion and contraction in transferring a toner image. Further, in an image forming apparatus having a fixing device, misalignment of two surfaces may occur due to an image magnification error caused by expansion and contraction of a recording medium resulting from heating.

For example, Japanese Laid-open Patent Publication No. 2004-347842 discloses a technology for preventing misalignment of images printed on two surfaces of a sheet by detecting dimensions in a sheet transporting direction and in a sheet width direction orthogonal to the sheet transporting direction before and after printing the image on the sheet serving as a recording medium, and correcting the images based on changes in the dimensions computed based on detected results.

However, in a method of correcting image magnification based on the measured results of the sheet size before and after printing the image on one side of the sheet, such as that disclosed in Patent Document 1, it is typical to measure a dimension in the width direction of the sheet at a predetermined timing based on a counter value, or the like after the detection of a front end of the transported sheet.

In such a method, in an image forming apparatus employing a switchback system to turn the sheet the other way up or back to front after printing an image on one surface of the sheet, a dimension measuring position in a width direction before printing the image on one surface of the sheet may differ from a dimension measuring position in the width direction after printing the image on that surface of the sheet. In such a case, even though the magnification of an image to be printed is corrected based on width dimensions measured at different positions in the sheet transporting direction before and after the printing the image on one side of the sheet, the misalignment of two surfaces of the sheet is not necessarily corrected due to the ratio of expansion and contraction varying at different positions in the sheet transporting direction.

RELATED ART DOCUMENTS

Patent Document

Patent Document 1: Japanese Laid-open Patent Publication No. 2004-347842

SUMMARY OF THE INVENTION

Accordingly, it is a general object in one embodiment of the disclosures to provide an image forming apparatus capable of improving accuracy in alignment of an image to be printed on two surfaces of a recording medium by measuring a size of the recording medium before and after an image is formed on the recording medium at identical positions in a recording medium transporting direction.

According to one aspect of the embodiment, there is provided an image forming apparatus that includes an image forming unit configured to form an image on a recording medium; an inverting transport unit configured to invert a first surface (a front surface) and a second surface (a rear surface) of the recording medium on which the image is formed by the image forming unit, and a front end and a rear end of the recording medium to transport the inverted recording medium; a recording medium width measuring unit configured to measure an end position of the recording medium in a width direction orthogonal to a transporting direction of the recording medium before and after the image is formed on the recording medium by the image forming unit; and a correcting unit configured to correct an image to be formed on a subsequent recording medium by the image forming unit based on a change in a shape of the recording medium computed based on a measured result obtained by the recording medium width measuring unit. In the image forming apparatus, the recording medium width measuring unit measures the end position of the recording medium in the width direction at a measuring position having an approximately identical distance from one end of the recording medium in the transporting direction of the recording medium before and after the image is formed on the recording medium by the image forming unit.

The object and advantages of the invention will be realized and attained by means of the elements and combinations particularly pointed out in the claims.

It is to be understood that both the foregoing general description and the following detailed description are exemplary and explanatory and are not restrictive of the invention as claimed.

Other objects and further features of the present invention will be apparent from the following detailed description when read in conjunction with the accompanying drawings.

DESCRIPTION OF THE PREFERRED EMBODIMENTS

Figure 1:
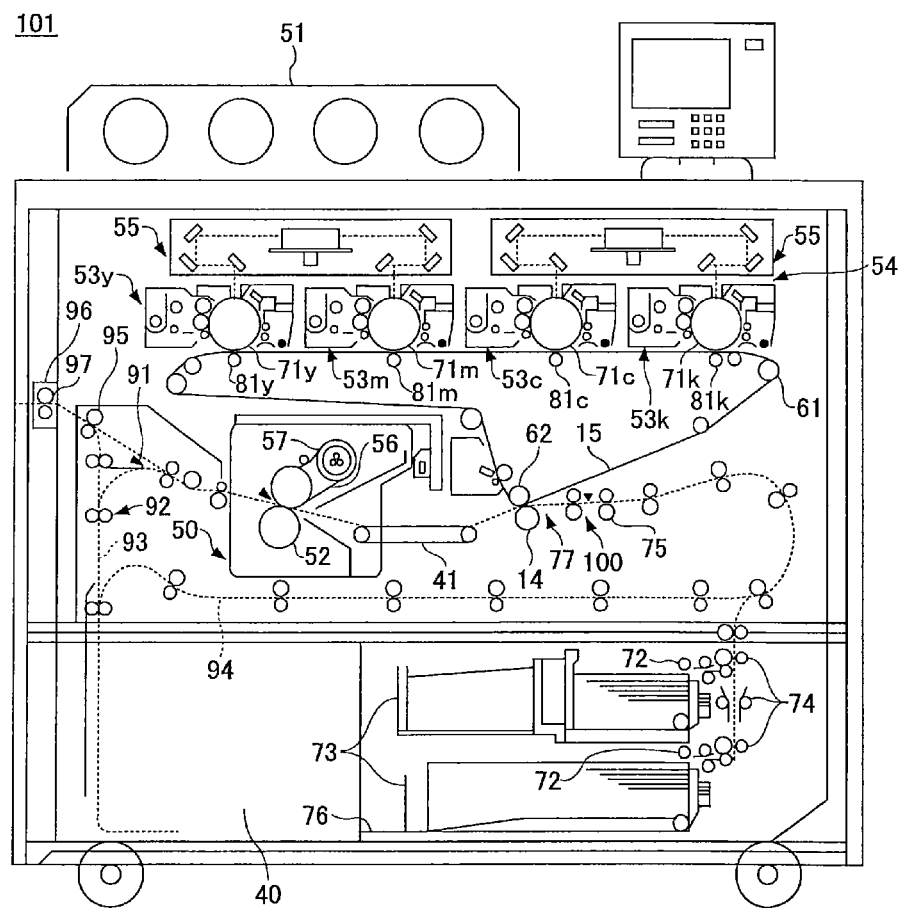
FIG. 1 is a diagram illustrating a schematic configuration example of an image forming apparatus according to an embodiment.

In the following, preferred embodiments of the present invention will be described with reference to the accompanying drawings. In the drawings, identical components are designated by the same reference numerals, and duplicated descriptions thereof will be omitted.

Configuration of Image Forming Apparatus

FIG. 1 is a diagram illustrating a schematic configuration example of an image forming apparatus 101 according to an embodiment.

The image forming apparatus 101 includes an image forming unit configured to include a tandem image forming device 54, an intermediate transfer belt 15, and a secondary transfer device 77, such that the image forming unit may form an image on a sheet S serving as a recording medium such as an overhead projector (OHP) sheet.

The intermediate transfer belt 15 is disposed approximately in the middle of the image forming apparatus 101, and is looped over plural rollers such that the intermediate transfer belt 15 is rotatable in a clockwise direction in FIG. 1. The intermediate transfer belt 15 is configured to be rotationally driven by a rotatable driving roller 61.

The tandem image forming device 54 is configured to include plural developing devices disposed along the intermediate transfer belt 15. An exposure device 55 is configured to be disposed above the tandem image forming device 54. Each of the developing devices 53 in the tandem image forming device 54 is configured to include a photoconductor drum 71 serving as an image carrier configured to carry a toner image of a corresponding one of colors.

Further, a primary transfer roller 81 is disposed at a position facing a corresponding one of the photoconductor drums 71 via the intermediate transfer belt 15. This position serves as a primary transfer position at which the toner image is transferred from the photoconductor drum 71 to the intermediate transfer belt 15.

The secondary transfer device 77 is disposed at a position opposite to the tandem image forming device 54 via the intermediate transfer belt 15, that is, at a position downstream in an intermediate transfer belt 15 transporting direction. The secondary transfer device 77 is configured to press a roller 62 serving as a counter secondary transfer roller against the secondary transfer roller 14 to generate a transferring electric field. As a result, the image on the intermediate transfer belt 15 is transferred onto the sheet S. The secondary transfer device 77 is configured to change a transferring electric current of the secondary transfer roller 14 in accordance with types of the sheet S. Note that the transferring electric current of the secondary transfer roller 14 serves as a parameter of a transferring condition.

Further, the image forming apparatus 101 includes a sheet transporting device 100 configured to compute a shape of the sheet S by measuring a length of the sheet S in a sheet transporting direction (hereinafter also called a "transporting direction"), and a length of the sheet S in a sheet width direction (hereinafter also called a "width direction") orthogonal to the transporting direction, based on the later-described configuration and method.

A fixing device 50 is configured to include a halogen lamp 57 as a heat source, a fixing belt 56 serving as an endless belt, and a pressure roller 52 being pressed against the fixing belt 56. The fixing device 50 is configured to change temperatures of the fixing belt 56 and the pressure roller 52, which are parameters of a fixing condition, a nip width between the fixing belt 56 and the pressure roller 52, and the velocity of the pressure roller 52, based on a type, thickness, and the like of the sheet S. The sheet S is, after the image is transferred onto the sheet S, transported by a transporting belt 41 from the secondary transfer device 77 to the fixing device 50.

When image data are transmitted to the image forming apparatus 101 and the image forming apparatus 101 receives image forming start signals, a not illustrated driving motor rotationally drives the roller 61 such that other rollers are rotationally driven to rotate with the intermediate transfer belt 15. Simultaneously, each of the developing devices 53 forms a corresponding one of single color images on a corresponding one of the photoconductor drums 71. The single color images formed in the developing devices 53 are sequentially transferred onto the rotationally driven intermediate transfer belt 15 to superpose the sequentially transferred single color images over one another, thereby forming a composite color image.

Further, the sheet S is dispensed from one of feed cassettes 73 by one of feed rollers 72 of a feed table 76 being selected and rotated, and the dispensed sheet S is then transported by a transport roller 74. Thereafter, the transported sheet S is stopped by reaching a resist roller 75 serving as an example of a resist unit. The resist roller 75 is configured to correct a sheet S transporting direction, and rotate the sheet S to transport the sheet S simultaneously with an image forming timing at which the composite color image on the intermediate transfer belt 15 reaches the secondary transfer device 77. The composite color image formed on the intermediate transfer belt 15 is transported to the secondary transfer device 77, where the composite color image on the intermediate transfer belt 15 is transferred onto a surface (front surface or first surface) of the sheet S.

The sheet S on which the composite color image has been transferred is transported by the transporting belt 41 to the fixing device 50, where the transferred composite color image is melted by applying heat and pressure to the sheet S to fix the transferred composite color image on the sheet S. For duplex printing, the sheet S on the surface of which the transferred composite color image has been fixed is transported by a branching claw 91 and a flip roller 92 to a sheet inverting path 93 and a two surface transporting path 94, where the composite color image is formed on a rear surface (second surface) of the sheet S.

Further, for inverting the sheet S, the branching claw 91 guides the sheet S to the sheet inverting path 93 to invert the sheet S from its front surface (first surface) to its rear surface (second surface). For simplex printing or printing without sheet inversion, the branching claw 91 transports the sheet S to a discharge roller 95. The sheet inverting path 93 and the two surface transporting path 94 serve as inverting transport units, and are configured to invert, after the image has been formed on one of the front surface (first surface) and the rear surface (second surface), the sheet S from its front surface to its rear surface, or to invert the sheet S from its front end to its rear end. The inverted sheet S is then directed and transported toward the secondary transfer device 77.

Thereafter, the sheet S on one surface or two surfaces of which the image is printed is transported by the discharge roller 95 to a decurling unit 96. In the decurling unit 96, the decurling amount is changed based on the sheet S by changing the amount of pressure applied to a decurling roller 97 to reduce the amount of curl of the sheet S. The sheet S having the reduced amount of curl is then discharged outside from the image forming apparatus 101.

Note that a resist gate and a skew correcting mechanism may be disposed in place of the resist roller 75 to serve as a resist mechanism configured to correct the position of the sheet S in the transporting direction, and the position of the sheet S in the width direction orthogonal to the transporting direction. In this case, a sheet transporting device 100 transports the sheet S such that the sheet S reaches a secondary transfer part simultaneously with the toner image on the intermediate transfer belt 15 reaching the secondary transfer part. In this embodiment, the sheet transporting device 100 is configured to transfer the sheet S at a constant transporting velocity; however, the sheet transporting device 100 may be configured to control variable transporting velocities while transporting the sheet S.

Further, the image forming apparatus 101 according to the embodiment is configured to transfer a color toner image formed on the intermediate transfer belt 15 onto the sheet S. However, the image forming apparatus 101 according to the embodiment may be configured to transfer respective single color toner images formed on plural photoconductor drums 71 directly onto the sheet S by superposing the respective single color toner images onto one another. In addition, the image forming apparatus 101 according to the embodiment may be applicable to a monochrome image forming apparatus.

Figure 2:
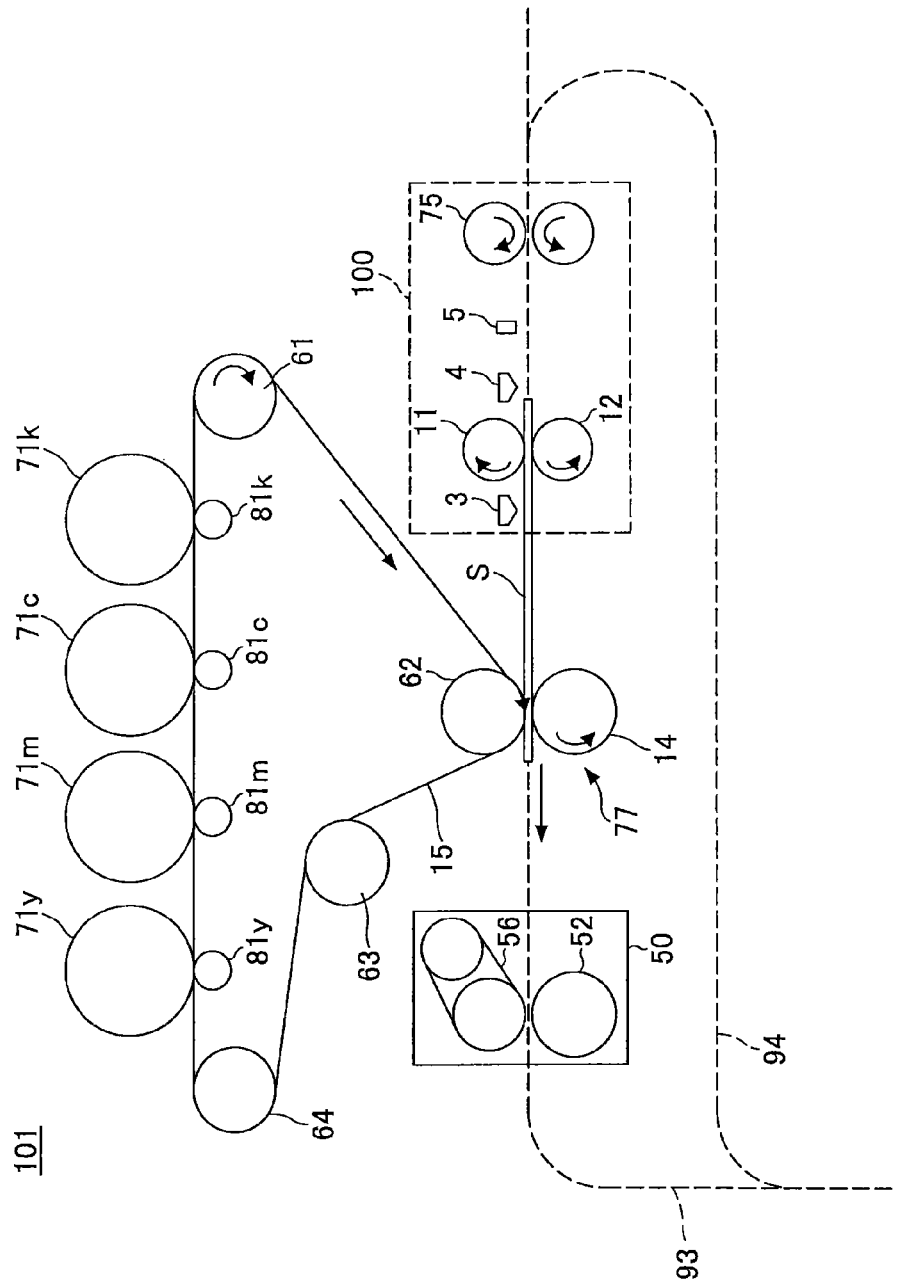
FIG. 2 is a diagram illustrating a schematic configuration example of a main part of the image forming apparatus according to the embodiment.

FIG. 2 is a diagram illustrating a schematic configuration example of a main part of the image forming apparatus 101 according to the embodiment.

As illustrated in FIG. 2, in the image forming apparatus 101, a sheet transporting device 100 is disposed in the sheet S transporting path.

The sheet transporting device 100 is configured to compute a shape of the sheet S by measuring a length of the sheet S in the transporting direction, and a length of the sheet S in the width direction orthogonal to the transporting direction, while transporting the sheet S to the secondary transfer device 77.

Specifically, the sheet transporting device 100 is configured to compute a change in shape of the sheet S before and after an image is formed on the sheet S in duplex printing, by measuring a shape of the sheet S before an image is formed on a first surface (a front surface) of the sheet S, and measuring a shape of the sheet S after the image is transferred onto the sheet S; the transferred image is fixed on the first surface of the sheet S, and the sheet S is inverted and transferred. Hence, the image forming apparatus 101 may be able to improve accuracy in alignment of two surfaces by correcting the magnification of a size of the image to be printed on a second surface (a rear surface) of the sheet S, based on the change in shape of the sheet S in duplex printing computed in the sheet transporting device 100, so as to meet (match) the size of the image to be printed and the shape of the sheet S.

Note that in duplex printing of the sheet S, the sheet S is heated and pressurized while passing through the fixing device 50 to fix the image on the first surface (i.e., the front surface). As a result, the sheet S deforms by contraction and expansion. The sheet S deforms continuously with its temperature decrease after passing through the fixing device 50. Accordingly, in order to compute the shape of the sheet S to correct the magnification ratio of the image to be printed on the rear surface (i.e., the second surface) of the sheet S, it may be preferable to compute the shape of the sheet S immediately before transferring the image onto the sheet S. For that reason, it may be preferable to dispose the sheet transporting device 100 directly (i.e., immediately) above the secondary transfer device 77.

Configuration of Sheet Transporting Device

Figure 3:
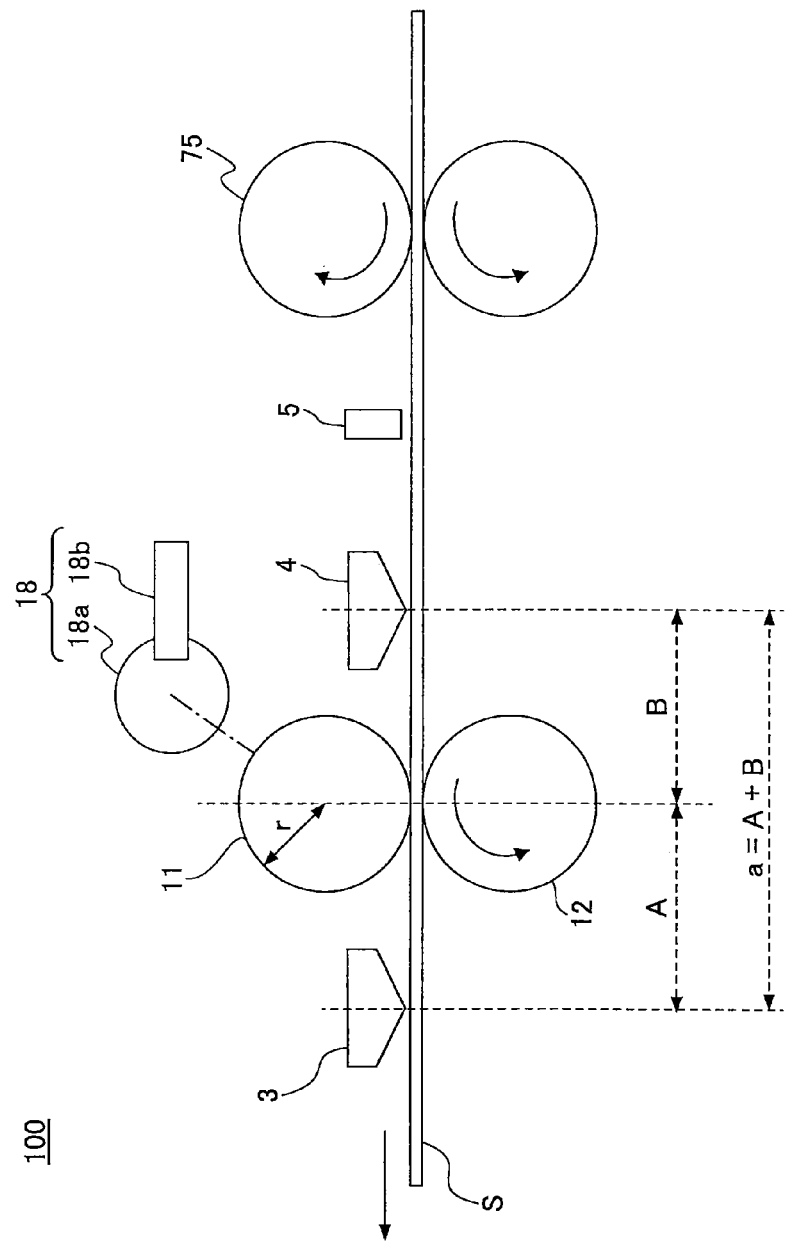
FIG. 3 is a cross-sectional schematic diagram illustrating a configuration example of a sheet transporting device in the image forming apparatus according to the embodiment.

A description is given below of a configuration of the sheet transporting device 100 of the image forming apparatus 101. FIG. 3 is a cross-sectional schematic diagram of the sheet transporting device 100, and FIG. 4 is an upper surface schematic diagram of the sheet transporting device 100.

The sheet transporting device 100 serves as an example of a transport unit, and is configured to include a driving roller 12 configured to be rotationally driven by receiving driving force of a not-illustrated drive unit (e.g., a motor, or the like), and a driven roller 11 configured to be driven via the driving roller 12 by sandwiching the sheet S between the driving roller 12 and the driven roller 11.

The sheet transporting device 100 is configured to further include a resist roller 75 upstream of the driven roller 11 and the driving roller 12 in the sheet S transporting direction. Note that the secondary transfer device 77 is disposed downstream of the driven roller 11 and the driving roller 12 in the sheet S transporting direction.

Figure 4:
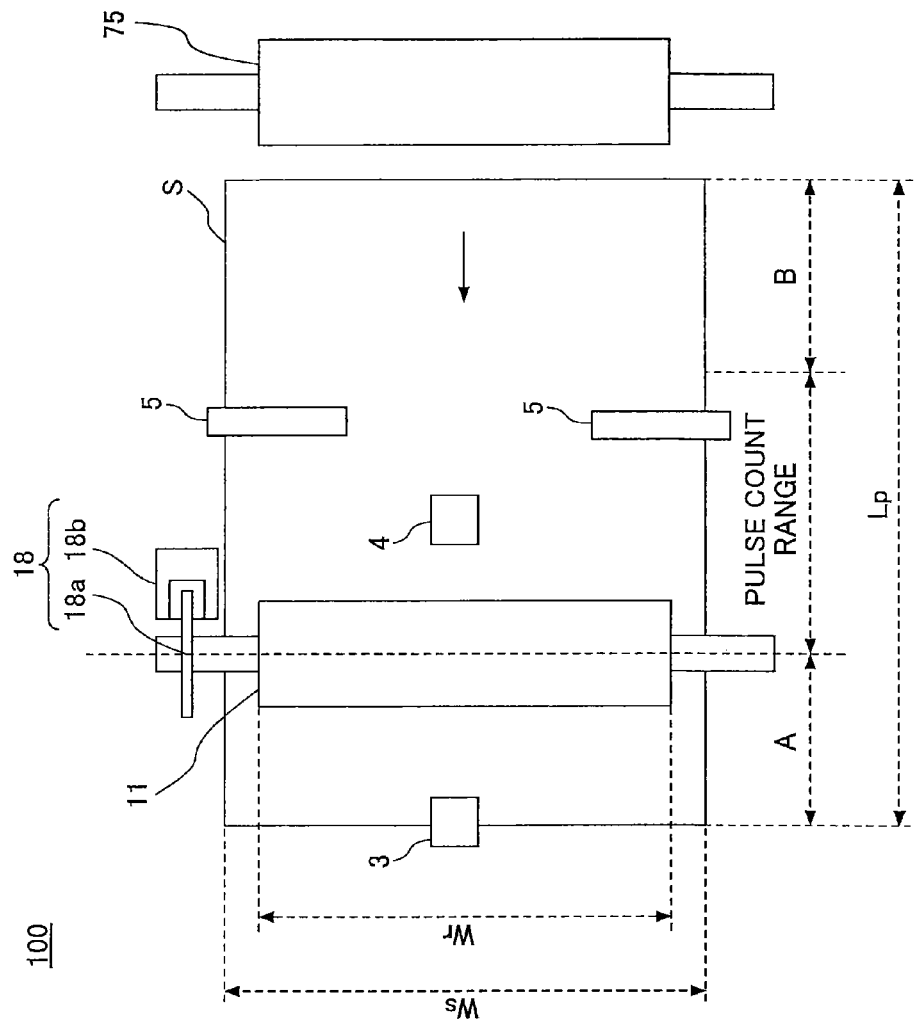
FIG. 4 is an upper surface schematic diagram illustrating a configuration example of the sheet transporting device in the embodiment.

As illustrated in FIG. 4, a length Wr of the driven roller 11 in a width direction orthogonal to the sheet S transporting direction is configured to be less than a length Ws of the sheet S transported by the sheet transporting device 100. The driven roller 11 will not be in contact with the driving roller 12 when the sheet S is being transported. Hence, the driven roller 11 is rotationally driven by friction generated between the driven roller 11 itself and the sheet S alone. Therefore, the transporting distance of the sheet S or the length of the sheet S in the transporting direction may be more accurately computed by the later-described method without allowing the driven roller 11 to receive the effect of the driving roller 12 when the sheet S is being transported.

A rotary encoder 18 is disposed on a rotary shaft of the driven roller 11 of the sheet transporting device 100 as illustrated in FIGS. 3 and 4. A not-illustrated pulse counting unit is configured to measure a rotating amount of the driven roller 11 as a sheet S transporting amount by detecting slits formed in an encoder disk 18a to count the number of pulse signals generated by an encoder sensor 18b.

Note that in this embodiment, the rotary encoder 18 is disposed on the rotary shaft of the driven roller 11; however, alternatively, the rotary encoder 18 may be disposed on a rotary shaft of the driving roller 12. Note also that the smaller the diameter of the roller (the driven roller 11 or the driving roller 12) to which the rotary encoder 18 is attached, the larger the number of counted pulses incremented by an increase in the number of rotations along with the transportation of the sheet S may be, which is preferable in computing the transporting distance of the sheet S or the length of the sheet S in the transporting direction with high accurately.

Further, it is preferable that the driven roller 11 or the driving roller 12 to which the rotary encoder 18 is attached be formed of a metallic roller so as to secure axial runout accuracy. It may be possible to highly accurately measure the later described sheet S transporting distance by suppressing rotational axial runout.

Sensors 4 and 3 are respectively disposed upstream and downstream of the driven roller 11 and the driving roller 12 in the sheet S transporting direction. The sensors 3 and 4 each are configured to detect both ends of the transported sheet S while the sheet S passes through the respective sensors 3 and 4. Examples of the sensors 3 and 4 may include transmissive or reflective photosensors configured to exhibit highly accurate detectability to detect the ends of the sheet S. In this embodiment, the reflective photosensors are employed as the sensors 3 and 4.

The sensor 3 disposed downstream of the driven roller 11 and the driving roller 12 in the sheet S transporting direction indicates a start trigger sensor 3 serving as a downstream detector configured to detect a front end of the sheet S when the sheet S passes through the sensor 3. Likewise, the sensor 4 disposed upstream of the driven roller 11 and the driving roller 12 in the sheet S transporting direction indicates a stop trigger sensor 4 serving as an upstream detector configured to detect a rear end of the sheet S when the sheet S passes through the sensor 4.

The start trigger sensor 3 and the stop trigger sensor 4 are disposed approximately at identical positions in the width direction orthogonal to the sheet S transporting direction, as illustrated in FIG. 4. With such arrangements, the transporting direction of the sheet S (i.e., skewed direction with respect to the transporting direction) may be minimized, thereby measuring the transporting distance of the sheet S more accurately.

Note that in this embodiment, the two sensors and 4 are disposed approximately at the central position in the width direction orthogonal to the sheet S transporting direction. However, the two sensors 3 and 4 may be disposed at positions shifted in either of the width directions from the central position insofar as the sheet S passes through such shifted positions.

In addition, the sheet transporting device 100 is configured to further include a line sensor 5 between the resist roller 75 and the driven roller 11 in the sheet S transporting direction. The line sensor 5 is an example of a recording medium width measuring unit, and is configured to detect respective positions of opposite ends in the width direction of the transported sheet S. In this embodiment, the line sensor 5 is formed of two line sensors disposed one at each of the opposite ends in the width direction of the sheet S. However, alternatively, the line sensor 5 may be formed of one line sensor having a length greater than or equal to the width of the sheet S disposed so as to detect the respective positions of the opposite ends in the width direction of the transported sheet S. Further, when the sheet transporting device 100 is able to measure the positions of the two opposite ends in the width direction of the sheet S, the line sensor 5 may, for example, include touching members configured to touch the opposite ends in the width direction of the sheet S, respectively, to measure the width of the sheet S based on displaced amounts of the touching members.

A distance A illustrated in FIGS. 3 and 4 indicates a distance between the start trigger sensor 3 and a combination of the driven roller 11 and the driving roller 12, whereas a distance B indicates a distance between the stop trigger sensor 4 and the combination of the driven roller 11 and the driving roller 12. It is preferable to reduce the distances A and B to be as short as possible to increase the later described pulse count range.

The driving roller 12 is configured to rotate in a direction indicated by an arrow in FIG. 3. The driven roller 11 is configured to be rotationally driven by the driving roller 12 when the driven roller 11 is not transporting the sheet S, and configured to be rotationally driven by the sheet S when the driven roller 11 is transporting the sheet S. When the driven roller is rotated, the rotary encoder 18 disposed on the rotary shaft of the driven roller 11 generates pulses.

A not-illustrated pulse counting unit connected to the rotary encoder 18 serves as an example of a transport amount measuring unit, and is configured to count the generated pluses output from the rotary encoder 18 to measure a transport amount of the sheet S transported by the driven roller 11 and the driving roller 12.

The sheet transporting device 100 according to this embodiment includes the above-described configuration, and is capable of measuring a transporting distance of the sheet S, a length of the sheet S in the transporting direction, and a length of the sheet S in the width direction orthogonal to the transporting direction while transporting the sheet S.

Functional Configuration of Image Forming Apparatus

Figure 5:
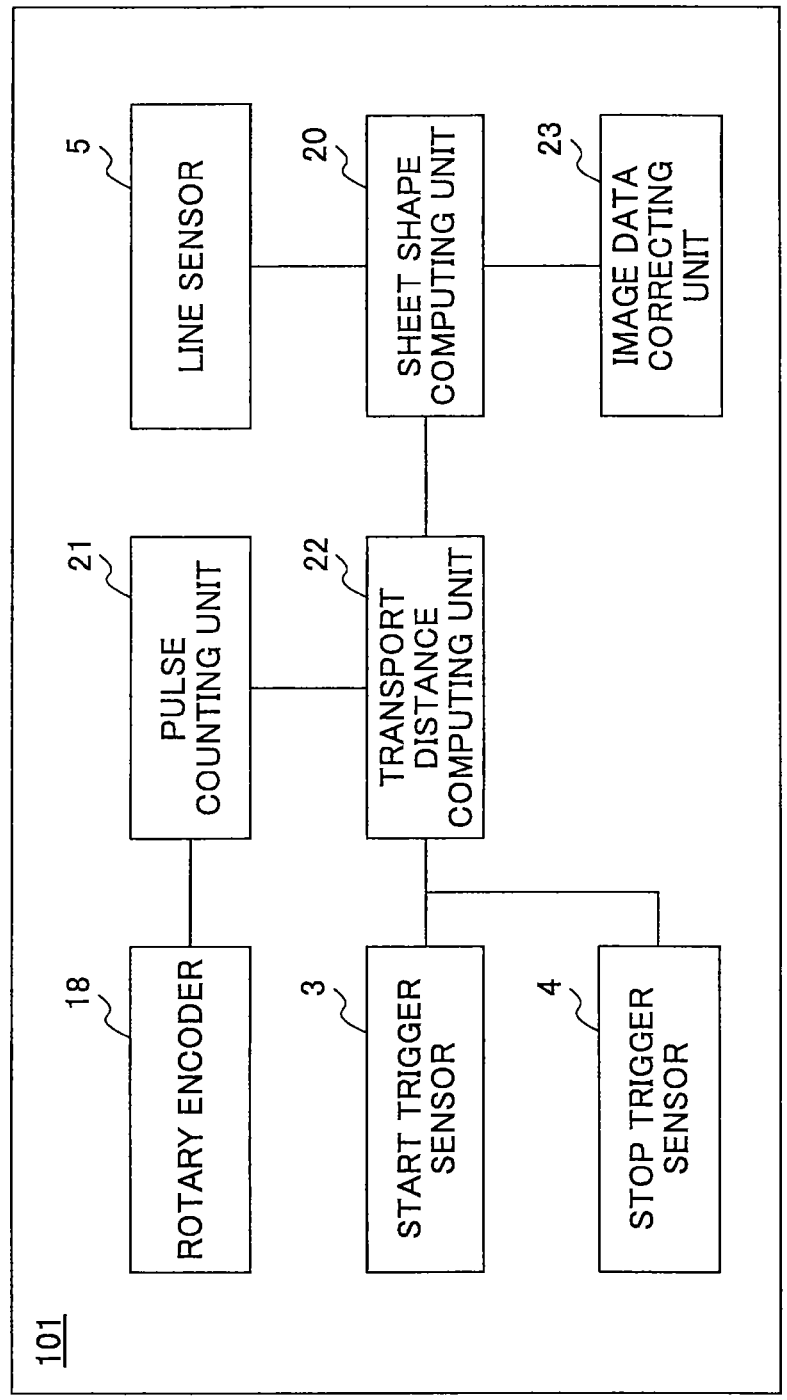
FIG. 5 is a block diagram illustrating a functional configuration example of the image forming apparatus according to the embodiment.

FIG. 5 is a block diagram illustrating a functional configuration example of the image forming apparatus 101 according to the embodiment.

As illustrated in FIG. 5, the image forming apparatus 101 is configured to include the start trigger sensor 3, the stop trigger sensor 4, the line sensor 5, the rotary encoder 18, a sheet shape computing unit 20, a pulse counting unit 21, a transport distance computing unit 22, and an image data correcting unit 23.

The sheet shape computing unit 20 is configured to compute a shape of the sheet S based on a computed result of the length of the sheet S in the transporting direction computed by the transport distance computing unit 22 and a measured result of the length of the sheet S in the width direction measured by the line sensor 5.

The pulse counting unit 21 is configured to measure a rotating amount of the driven roller 11 as a sheet S transporting amount by detecting slits formed in the encoder disk 18a to count the number of pulse signals generated by the encoder sensor 18b.

The transport distance computing unit 22 is configured to compute the transporting distance of the sheet S and the length of the sheet S in the transporting direction based on detected results of the sheet S obtained by the start trigger sensor 3 and the stop trigger sensor 4, and the rotating amount of the driven roller 11 measured by the pulse counting unit 21.

The image data correcting unit 23 is an example of a correcting unit, and is configured to correct a size of an image formed by the image forming apparatus 101 on the sheet S based on the shape of the sheet S computed by the sheet shape computing unit 20.

The image forming apparatus 101 is configured to print an image with high accuracy in alignment of two surfaces in duplex printing by allowing the image correcting unit to correct image data based on the shape of the sheet S computed by the sheet shape computing unit 20.

Sheet Shape Computation

Length of Sheet in Transporting Direction

Next, a description is given of a method of computing a transporting distance of the sheet S and a length of the sheet S in the transporting direction in the image forming apparatus 101.

Figure 6:
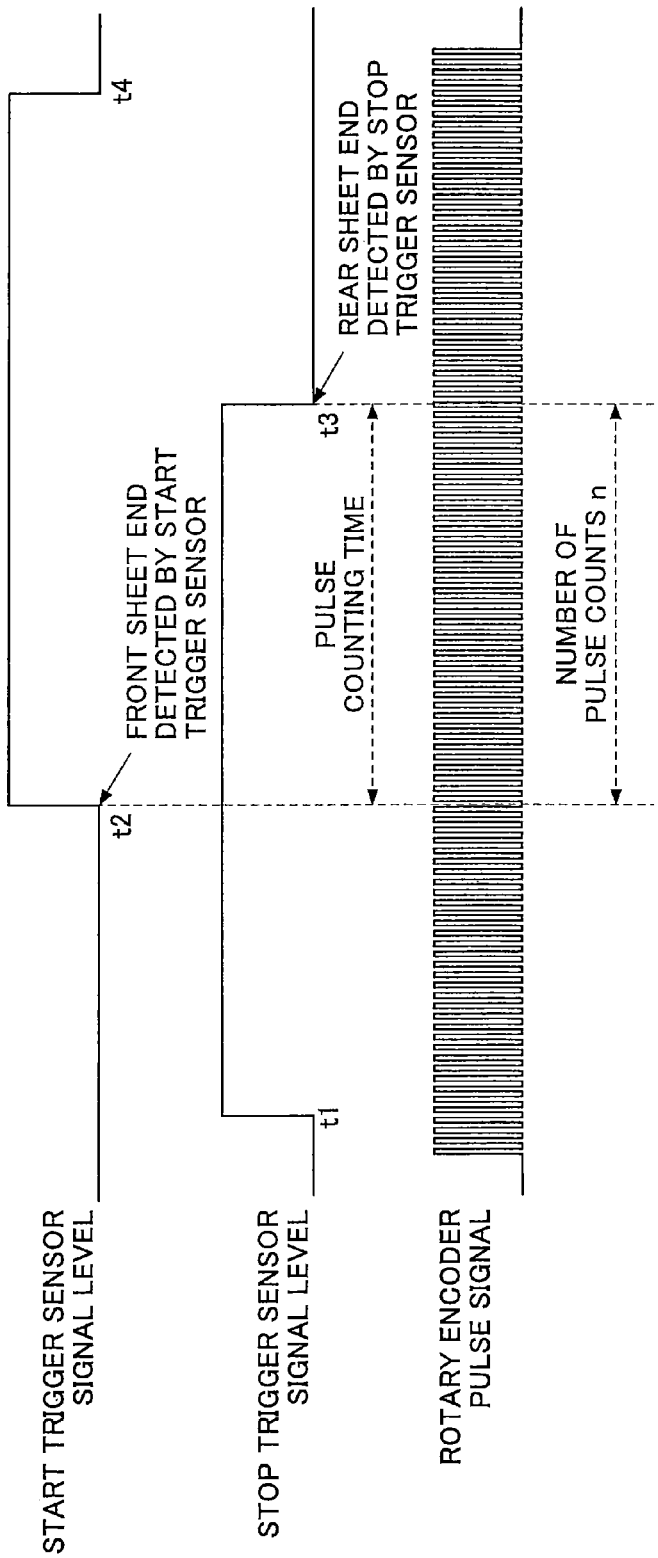
FIG. 6 is a diagram illustrating output examples of a start trigger sensor, a stop trigger sensor, and a rotary encoder in the embodiment.

FIG. 6 illustrates output examples of the start trigger sensor 3, the stop trigger sensor 4, and the rotary encoder 18 in the image forming apparatus 101 according to the embodiment.

As described above, when the driven roller 11 is rotated, the rotary encoder 18 disposed on the rotary shaft of the driven roller 11 generates pulses.

In the example illustrated in FIG. 6, after the sheet S starts being transported, the stop trigger sensor 4 detects a front end of the sheet S at time t1 when the front end passes through the stop trigger sensor 4, and the start trigger sensor 3 detects the front end of the sheet S at time t2 when the front end passes through the start trigger sensor 3.

Subsequently, the stop trigger sensor 4 detects a rear end of the sheet S at time t3 when the rear end passes through the stop trigger sensor 4, and the start trigger sensor 3 detects the rear end of the sheet S at time t4 when the rear end passes through the start trigger sensor 3.

At this moment, the pulse counting unit 21 counts the number of pulses of the rotary encoder 18 in a pulse counting time from time t2 at which the start trigger sensor 3 detects the front end of the sheet S at time t2 to time t3 at which the stop trigger sensor 4 detects the rear end of the sheet S at time t3.

Here, r represents a radius of the driven roller 11 on which the rotary encoder 18 is disposed, N represents the number of encoder pulses per rotation of the driven roller 11, and n represents the number of pulses counted in the pulse counting time. In this case, the transporting distance Ld of the sheet S from time 2 to time 3 is computed by the following equation (1).

$$Ld = (n/N) \times 2\Pi r \quad (1)$$

n: Number of counted pulses
N: Number of encoder pulses[/r] per rotation of driven roller 11
r: Radius (mm) of driven roller The sheet transporting velocity may generally vary with accuracy of the outer dimensions of the roller (specifically, the driving roller 12) transporting the sheet S, mechanical accuracy such as concentric runout accuracy, rotational accuracy such as a motor, or accuracies of transmission mechanisms such as a gear, a belt, and the like. Further, the sheet transporting velocity may also vary with a slip phenomenon between the driving roller 12 and the sheet S, or a slack phenomenon due to the difference between the sheet transporting velocities upstream and downstream of the transport unit. Hence, a pulse period or a pulse width of the rotary encoder 18 constantly changes; however, the number of pulses will not be changed.

Accordingly, the transport distance computing unit 22 disposed in the sheet transporting device 100 may be able to highly accurately compute the transporting distance Ld of the sheet S transported by the driven roller 11 and the driving roller 12 based on the equation (1) without relying on the sheet transporting velocities. Note that the driven roller 11 and the driving roller 12 together serve as the transport unit.

Further, the transport distance computing unit 22 may also compute a ratio between pages of the sheet S, or a relative ratio such as a ratio of the two surfaces (front surface and rear surface or first surface and second surface) of the sheet S.

The transport distance computing unit 22 may, for example, compute an expansion and contraction ratio R by the following equation (2), based on a relative ratio of the sheet transporting distances before and after an image is formed on the sheet S in the image forming apparatus 101.

$$R = [(n2/N) \times 2\Pi r]/[(n1/N) \times 2\Pi r] \quad (2)$$

n1: Number of pulses counted at time of transporting sheet S before thermal fixation
n2: Number of pulses counted at time of transporting sheet S after thermal fixation In the following, examples of trial computation performed in the embodiment will be described.

In this embodiment, N=2800[/r], r=9 mm, and the number of pulses counted when the A3 size sheet is vertically transported is represented by n1=18816. In this case, a sheet transporting distance L1 of the sheet S is obtained as follows.

$$L1 = (18816/2800) \times 2\pi \times 9 = 380.00 \text{ mm}$$

Further, the number of pulses recounted after thermal fixation is performed on the sheet S is represented by n2=18759. In this case, a sheet transporting distance L2 of the sheet S may be obtained as follows.

$$L2 = (18759/2800) \times 2\pi \times 9 = 378.86 \text{ mm}$$

Hence, the difference in the transporting distance of the sheet S between the two surfaces of the sheet S may be obtained as follows.

$$\Delta L = 380.00 - 378.86 = 1.14 \text{ mm}$$

Accordingly, the expansion and contraction ratio R of the sheet S (i.e., a relative ratio of lengths of the surface and the rear surface of the sheet S) may be obtained as follows, based on the computed results of the transporting distances of the two surfaces of the sheet S.

$$R = 378.86/380.00 = 99.70\%$$

In this case, the length of the sheet S in the transporting direction contracts by approximately 1 mm. Hence, approximately 1 mm misalignment of the two surfaces (i.e., the surface and the rear surface) of the sheet S may be obtained when the image lengths of the surface and the rear surface of the sheet S are identical. Accordingly, the accuracy in alignment of the two surfaces of the sheet S may be improved by causing the image data correcting unit 23 to correct the length of the image to be formed on the rear surface of the sheet S based on the expansion and contraction ratio R.

Note that in the above-described example, the expansion and contraction ratio R is obtained by computing the transporting distances L1 and L2 of the sheet S before the thermal fixation is performed on the sheet S. However, the sheet transporting device 100 may alternatively include an expansion-contraction computing unit configured to compute, as the expansion and contraction ratio, a ratio of the numbers of the pulses n1 and n2 counted at respective times of transporting sheet S before and after the thermal fixation is performed on the sheet S.

For example, in the above-described example, when the number of pulses n1 counted at a time of transporting the sheet S before the thermal fixation is 18816 (i.e., n1=18816), and the number of pulses n2 counted at a time of transporting the sheet S after the thermal fixation is 18759 (i.e., n2=18759), the expansion and contraction ratio may be obtained as follows.

$$R = n2/n1 = 18759/18816 = 99.70\%$$

Note that a length Lp in the transporting direction of the sheet S may be obtained by adding a distance a between the start trigger sensor 3 and the stop trigger sensor 4 illustrated in FIG. 3 to the transporting distance Ld obtained by the equation (1).

$$Lp = (n/N) \times 2\Pi r + a \quad (3)$$

a: Distance between the start trigger sensor 3 and the stop trigger sensor 4

As described above, the transport distance computing unit 22 of the sheet transporting device 100 may be able to compute the length Lp in the transporting direction of the sheet S by the above equation (3), in which the distance a between the sensors is added to the distance the transporting distance Ld of the sheet S transported by the sheet transport unit computed by the above equation (1).

Further, the transport distance computing unit 22 may be able to compute the expansion and contraction ratio R of by the following equation (4), based on a relative ratio of the sheet S transporting distances Lp before and after electrophotographic thermal fixation is performed on the sheet S in the image forming apparatus 101.

$$R=[(n2/N)\times 2\Pi r+a]/[(n1/N)\times 2\Pi r+a] \quad (4)$$

As described above, the transport distance computing unit 22 of the image forming apparatus 101 may be capable of computing the transporting distance of the sheet S and the length of the sheet S in the transporting direction with high accuracy, and may optionally be capable of computing the expansion and contraction ratio R before and after the image is formed on the sheet S.

Note that the length of the sheet S in the transporting direction may be computed by the transport distance computing unit 22 in the following manner. For example, the transport distance computing unit 22 may compute the length of the sheet S in the transporting direction based on the following (A) and (B). (A): A time interval from a time at which the start trigger sensor 3 or the stop trigger sensor 4 has detected the front end of the sheet S in the sheet S transporting direction to a time at which the start trigger sensor 3 or the stop trigger sensor 4 has detected the rear end of the sheet S in the sheet S transporting direction. (B): A transporting velocity of the sheet S transported by the transport unit.

Length of Sheet in Width Direction

Next, a description is given of a method of measuring a length of the sheet S in the width direction orthogonal to the sheet S transporting direction in the image forming apparatus 101.

In this embodiment, a length of the sheet S in the width direction (hereinafter simply called a "width") is measured at two positions near the front end and the rear end of the sheet S in the transporting direction before an image is formed on a first surface of the sheet S, and the width is subsequently measured at two positions near the front end and the rear end of the sheet S that is inverted and transported after the image is formed on the first surface of the sheet S.

Figure 7A:
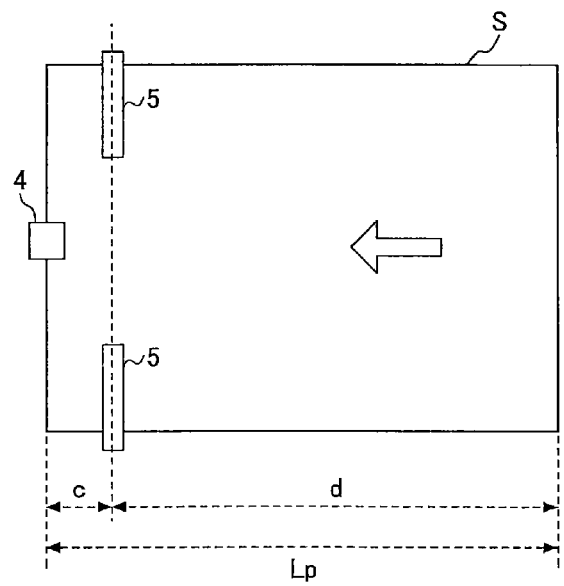
FIGS. 7A and 7B are diagrams illustrating examples of measuring positions of a width of a sheet in the embodiment.
Figure 7B:
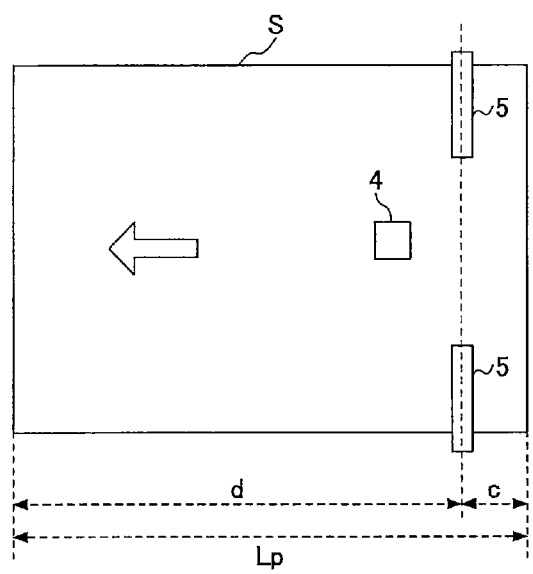

FIGS. 7A and 7B are diagrams illustrating examples of measuring positions of the width of the sheet S in the embodiment. FIGS. 7A and 7B depict the start trigger sensor 3, the driven roller 11, the driving roller 12, the resist roller 75, and the like as being omitted from the sheet transporting device 100.

The line sensor 5 measures the width of the sheet S after a time T1 has elapsed (FIG. 7A) and a time T2 has elapsed (FIG. 7B) from the time at which the stop trigger sensor 4 has detected the front end of the sheet S in the transporting direction.

In this case, a distance c is defined as a distance from the front end of the sheet S in the transporting direction to a width measuring position after a time T1 has elapsed from the time at which the stop trigger sensor 4 has detected the front end of the sheet S in the transporting direction, and a distance d is defined as a distance from the front end of the sheet S in the transporting direction to a width measuring position after a time T2 has elapsed. Further, times T1 and T2 are set such that a total value of the distances c and d approximately equals the length Lp of the sheet S in the transporting direction.

Figure 8A:
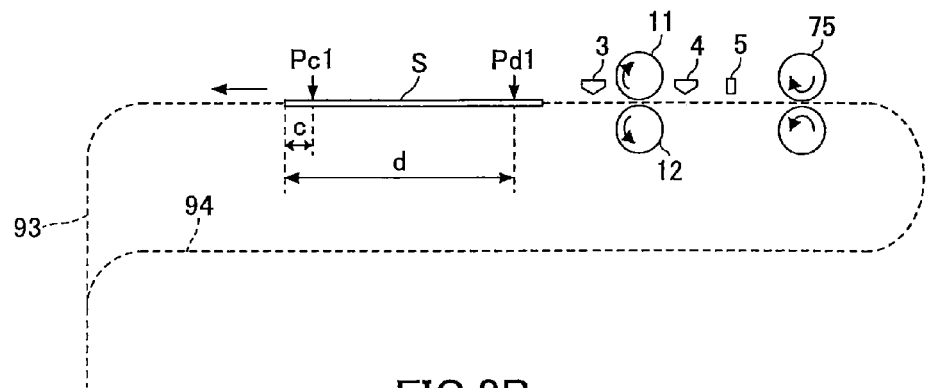
FIGS. 8A to 8C are diagrams illustrating examples of sheet transporting statuses and corresponding measuring positions of the width of the sheet in the embodiment.
Figure 8B:
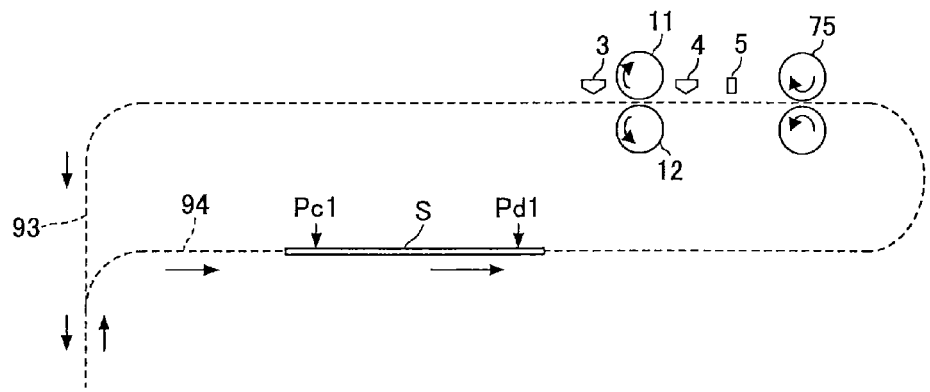
Figure 8C:
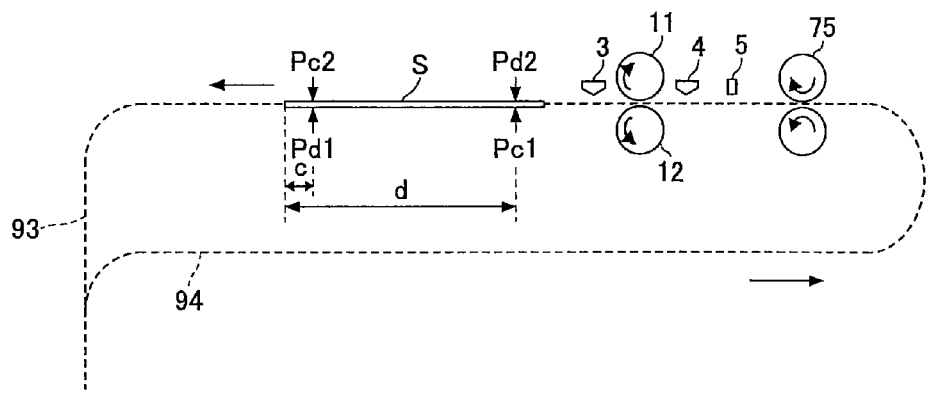

FIGS. 8A to 8C depict transporting statuses of the sheet S when the width of the sheet S is measured in the above-described conditions.

FIG. 8A depicts a status of the sheet S after the width of the sheet S is measured prior to an image being formed on one surface (a first surface) of the sheet S. In this status, the width of the sheet S is measured at a position Pc1 having a distance c, and a position Pd1 having a distance d, respectively, from the front end of the sheet in the transporting direction.

FIG. 8B depicts a status of the sheet S that is switched back at the sheet inverting path 93 for duplex printing, and is transported again in the two surface transporting path 94 back to the sheet transporting device 100. As illustrated in FIG. 8B, the sheet S is switched back at the sheet inverting path 93 such that the front end and the rear end of the sheet S in the transporting direction are switched, and the inverted sheet S is transported to the sheet transporting device 100. Hence, the switched back sheet S is transported in a status in which the front end of the sheet S in the transporting direction is disposed at the width measuring position Pd1, and the rear end of the sheet S in the transporting direction is disposed at the width measuring position Pc1.

FIG. 8C depicts a transporting status of the sheet S after a width of the sheet S is measured after an image is formed on one surface (i.e., the first surface), and before an image is formed on the other surface (i.e., a second surface). When the sheet S passes through the sheet transporting device 100 again, the line sensor 5 measures the width of the sheet S at the distance c and the distance d from the front end of the sheet S in the transporting direction. Note that a width measuring position Pc2 is defined as a position having a distance c from the front end of the sheet S in the transporting direction, and a width measuring position Pd2 is defined as a position having a distance d from the front end of the sheet S in the transporting direction. In this case, the width measuring position Pc2 corresponds to the width measuring position Pd1 before image formation, and the width measuring position Pd2 corresponds to the width measuring position Pc1 before image formation. Hence, the width of the sheet S is measured at the width measuring position Pc2 and the width measuring position Pd2 that are approximately identical width measuring positions of the sheet S before and after the image formation.

In the above-described example, it may be possible to measure the width of the sheet S at measuring positions approximately identical to those from an end of the inverted sheet S in the sheet transporting direction by measuring the width of the sheet S at respective positions having the distance c and the distance d from the front end of the sheet S in the sheet transporting direction, the sum of the distance c and the distance d resulting in the length Lp of the sheet S in the sheet transporting direction, without changing the settings of times T1 and T2 at which the width of the sheet S before and after the image formation is measured after the front end of the sheet S has been detected.

Note that the sheet S may expand or contract in the sheet transporting direction, which may interfere with accurate measurement of the width of the sheet S at identical positions before and after the image formation. However, the accurate measurement will not be interfered with when the width of the sheet S is measured at positions having respective distances approximately identical to those from one end of the sheet S before and after the image formation.

For example, in a case of transporting the sheet S having an A3 size (width: 297 mm, length: 420 mm), the following example of the sheet S is considered. That is, the sheet S contracts in a trapezoidal shape, with the contraction ratio of the length of the sheet S being 0.5%, the contraction ratio of the width of the sheet S measured at a position of the front end of the sheet S being 0.3%, the contraction ratio of the width of the sheet S measured at a position of the rear end of the sheet S being 0.5% in the sheet transporting direction after an image is formed on one surface (i.e., the first surface) of the sheet S. In this case, the width measuring positions before and after the image formation are misaligned (or shifted) due to the contraction of the sheet S, and hence, the measured values of the width of the sheet S include errors. However, even though the measuring position is shifted by 5 mm in the sheet transporting direction, a change in an amount of the measured value of the width is 0.007 mm, which imposes substantially no effect on the measurement of the width of the sheet S. This indicates that measuring the width of the sheet S will not be affected when the width of the sheet S is measured at the measuring positions having approximately identical distances from one end of the sheet S before and after the image formation.

Further, a unit configured to measure a length Lp of the sheet S in the sheet transporting direction at a position upstream of the sheet transporting device 100 may be additionally provided, and a time interval until the width of the sheet S is measured after the front end of the sheet S is detected may be adjusted based on the measured length Lp of the sheet S in the sheet transporting direction. Hence, the width of the sheet S before and after image formation may accurately be measured at identical positions.

Figure 9:
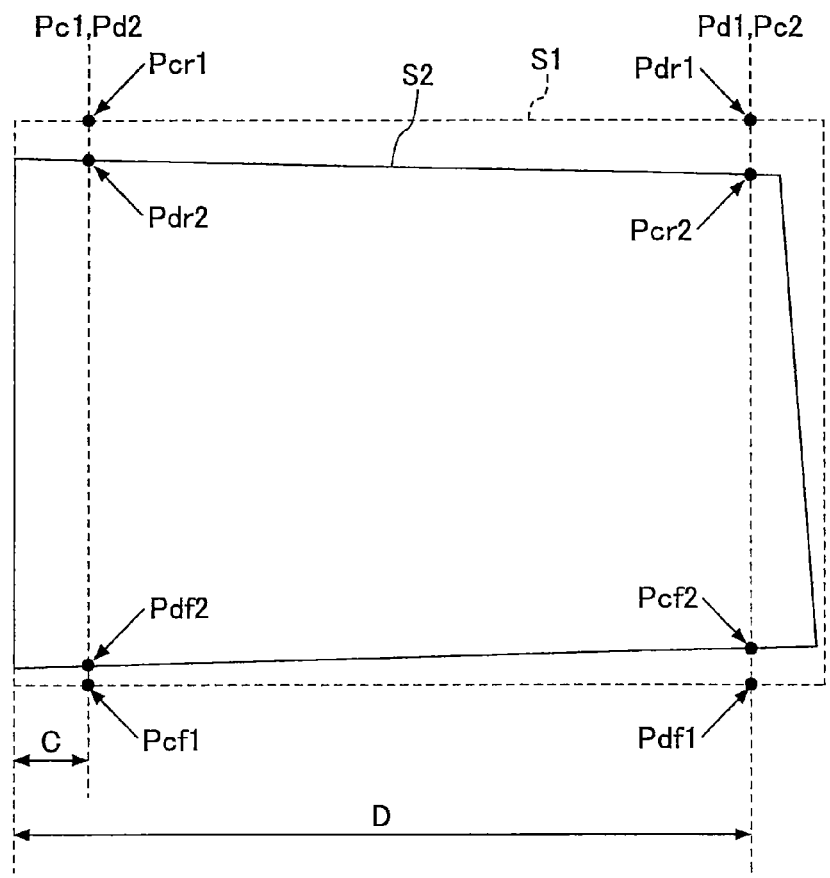
FIG. 9 is a diagram illustrating an example of measured results of the width of the sheet in the embodiment.

FIG. 9 is a diagram illustrating an example of measured results of the width of the sheet in the embodiment. In FIG. 9, a broken line illustrates a shape of a sheet S1 before image formation whereas a solid line illustrates a shape of a sheet S2 after image formation.

As illustrated in FIG. 9, in the sheet S before image formation, Pcf1 and Pcr1 are defined as opposite ends of the sheet S1 at a width measuring position Pc1, and Pdf1 and Pdr1 are defined as opposite ends of the sheet S1 at a width measuring position Pd1. Similarly, in the sheet S after image formation, Pcf2 and Pcr2 are defined as opposite ends of the sheet S1 at a width measuring position Pc2, and Pdf2 and Pdr2 are defined as opposite ends of the sheet S1 at a width measuring position Pd2.

In this case, when Pcf1 is determined as a reference position (i.e., one-sided reference in the sheet width direction), the following equation computes a change $\Delta Wc$ in an amount of a sheet width at a width measuring position having a distance c from the front end in the transporting direction of the sheet S before image formation.

$$\Delta Wc=(Pdf2-Pcf1)/\text{DPI}+(Pcr1-Pdr2)/\text{DPI}$$

Likewise, when Pcf1 is determined as a reference position (i.e., one-sided reference in the sheet width direction), the following equation computes a change $\Delta Wd$ in an amount of a sheet width at a width measuring position having a distance d from the front end in the transporting direction of the sheet S before image formation.

$$\Delta Wd=(Pcf2-Pdf1)/\text{DPI}+(Pdr1-Pcr2)/\text{DPI}$$

In the above equations, Pcf1, Pcr1, Pdr1, Pdr2, Pcf1, Pcr2, Pdf2, and Pdr2 represent respective positions of ends of the sheet S in the sheet width direction expressed by pixels (i.e., dots) of the line sensor 5, and DPI represents pixel resolution dots/inch (1 inch=25.4 mm) of the line sensor 5.

For example, in a case where $Pdf2-Pcf1=3$ dots $Pcr1-Pdr2=5$ dots $Pcf2-Pdf1=4$ dots $Pdr1-Pcr2=6$ dots DPI=300 dots/inch, the followings may be obtained:

$$\Delta Wc=(Pdf2-Pcf1)/\text{DPI}+(Pcr1-Pdr2)/\text{DPI}$$

$$=3/300+5/300$$

$$\approx 0.027 \text{ inches}$$

$$\approx 0.68 \text{ mm}$$

$$\Delta Wd=(Pcf2-Pdf1)/\text{DPI}+(Pdr1-Pcr2)/\text{DPI}$$

$$=4/300+6/300$$

$$\approx 0.033 \text{ inches}$$

$$\approx 0.85 \text{ mm}$$

This indicates that the width of the sheet S, on the first surface of which an image is formed, contracts by approximately 0.68 mm at a first end position in the sheet transporting direction, and contracts approximately 0.85 mm at a second end position in the sheet transporting direction, due to heat or pressure applied by the fixing device 50.

As illustrated above, the sheet transporting device 100 may be able to compute a change in the shape of the sheet S before and after the image is formed on one surface of the sheet S. Further, the sheet transporting device 100 may be able to accurately compute a change in each of the positions of the sheet S by performing measurements at positions having an identical distance from one end of the sheet S before and after the image is formed on one surface of the sheet S.

Note that in the above-described example, the width of the sheet S is measured at respective positions having a distance c and a distance d from the front end of the sheet S in the sheet transporting direction, and the sum of the distance c and the distance d results in the length Lp of the sheet S in the sheet transporting direction. However, the sum of the distance c and the distance d may differ from the length Lp of the sheet S in the sheet transporting direction. In such a case, different values are set before and after the image formation corresponding to a time interval from a time at which the front end of the sheet S is detected by the stop trigger sensor 4 to a time at which the width of the sheet S is measured at the width measuring position, such that width measuring positions before and after the image formation have identical distances from one end of the sheet S.

Figure 10A:
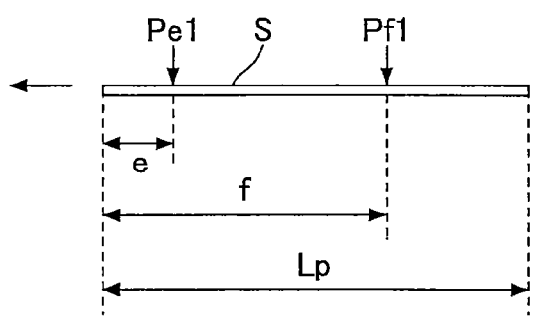
FIGS. 10A and 10B are diagrams illustrating other examples of measuring positions of the width of the sheet in the embodiment.
Figure 10B:
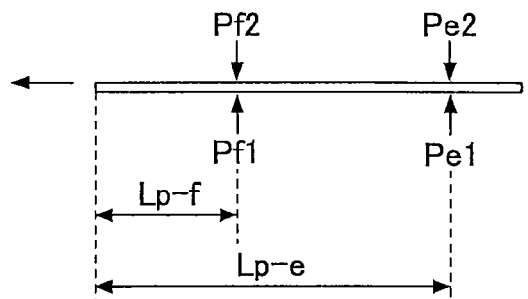

For example, as illustrated in FIG. 10A, a case in which the width of the sheet S is measured at measuring positions Pe1 and Pf1 having a distance e and a distance f ($e+f \neq Lp$) from the front end of the sheet S in the sheet transporting direction before image formation is considered. In this case, as illustrated in FIG. 10B, a time interval from a time at which the front end of the sheet S is detected by the stop trigger sensor 4 to a time at which the width of the sheet S is measured at the width measuring position is appropriately set, such that the width of the sheet S is measured at respective measuring positions having a distance (Lp−f) and a distance (Lp−e) from the front end of the sheet S in the sheet transporting direction after an image is formed on one surface of the sheet S. Accordingly, by appropriately setting the time interval from the detection of the front end of the sheet S to the measurement of the width of the sheet S, the width measuring positions before and after the image formation may be set such that the distances from the end of the sheet S are identical.

Note that the width measuring position of the sheet S may be one each before and after the image formation, or may alternatively be two or more each before and after the image formation. In either case, the shape of the sheet S may be accurately computed by measuring the width of the sheet S at a position having an identical distance from one end of the sheet S before and after the image formation. Moreover, the shape of the sheet S may be further accurately computed by measuring the width of the sheet S at plural positions.

Alternatively, the line sensor 5 may measure the width of the sheet S within a range of a several mm of each of the width measuring positions to compute the mean of the measured widths as the width of the sheet S. The opposite ends of the sheet S in the sheet transporting direction include tiny uneven parts. Hence, the width of the sheet S may be measured with higher accuracy by computing the mean of the plural measured widths.

Hence, the sheet transporting device 100 may be capable of computing the length of the sheet S in the sheet transporting direction and the length in the sheet width direction orthogonal to the sheet transporting direction based on the above-described method. The sheet shape computing unit 20 of the image forming apparatus 101 computes the shape of the sheet S based on the length of the sheet S in the sheet transporting direction and the length of the sheet S in the sheet width direction, and the image data correcting unit 23 corrects the magnification of the image printed on the other surface (i.e., the rear surface or the second surface) of the sheet S in accordance with the shape of the sheet S.

Image Data Correcting Method

Next, a description is given of a process of correcting the image magnification based on the shape of the sheet S computed by the sheet shape computing unit 20. In this embodiment, the computation of the shape of the sheet S is performed by the sheet shape computing unit 20 at a position immediately before the secondary transfer roller 14 (i.e., directly upstream in the sheet S transporting direction). Accordingly, an exposure data size or exposure timing computed based on the shape of the sheet S will not be reflected in the sheet S itself from which the shape is computed but reflected in image data of a subsequent sheet S.

The exposure device 55 of the image forming apparatus 101 includes a data buffer part formed of memory or the like and configured to protect input image data; an image data generator configured to generate image data for forming an image; an image magnification correcting part configured to correct magnification of the image; a clock generator configured to generate a writing clock; and a light emitting device configured to emit light to the photoconductor drum 71 to form an image.

The data buffer part may, for example, be configured to protect the input image data transmitted from a host device such as a controller with transfer clocks.

The image data generator is configured to generate image data based on writing clocks generated from the clock generator and pixel insertion-extraction information generated from the image magnification correcting part. Accordingly, the light emitting device is ON/OFF controlled by processing a length of one writing clock period drive data output from the image data generator as one pixel.

The image magnification correcting part is configured to generate image magnification switching signals based on the shape of the sheet computed by the sheet shape computing unit 20 of the sheet transporting device 100.

The clock generator is configured to operate at a high frequency of several times the writing clocks to change clock periods, and further to perform image correction such as pulse width modulation known in the art.

The light emitting device is formed of one of a semiconductor laser, a semiconductor laser array, and a surface emitting laser, or a plurality of any one of the semiconductor laser, the semiconductor laser array, and the surface emitting laser. The light emitting device is configured to apply light to the photoconductor drum 71 to form a electrostatic latent image on the photoconductor drum 71.

As described above, in the image forming apparatus 101 is capable of printing an image in compliance with a shape of the sheet S by causing the image data correcting unit 23 to correct image data to be printed on the sheet S in compliance with the shape of the sheet S computed by the sheet shape computing unit 20. Accordingly, it may be possible to correct magnification of an image to be printed with high accuracy when printing the image on the rear surface of the sheet S, which is deformed by passing through the fixing device 50 after the surface is printed, and to improve accuracy in alignment of the two surfaces of the sheet.

As described above, the image forming apparatus 101 according to the embodiment may be able to compute the shape of the sheet with high accuracy by measuring the width of the sheet S at a position having a distance from one end of the sheet S in the transporting direction of the sheet S after an image is formed on one surface of the sheet S approximately identical a distance from that end of the sheet S in the transporting direction of the sheet S before after the image is formed on that surface of the sheet S. Accordingly, the image forming apparatus 101 may be capable of improving accuracy in alignment of an image to be printed on the two surfaces of the sheet based on the shape of the sheet computed with high accuracy.

According to the embodiment, there is provided an image forming apparatus capable of improving accuracy in alignment of an image to be printed on two surfaces of a recording medium by measuring a size of a recording medium at identical positions in a recording medium transporting direction before and after an image is formed on the recording medium.

The invention is described on the basis of the embodiments described above; however, the invention is not limited to those embodiments. Various alterations and modifications may be made within the scope of the invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

The present application is based on and claims the benefit of priority of Japanese Priority Application No. 2012-240827 filed on Oct. 31, 2012, the entire contents of which are hereby incorporated by reference.

What is claimed is:

1. An image forming apparatus comprising:
an image forming unit configured to form an image on a recording medium;
an inverting transport unit configured to invert a first surface and a second surface of the recording medium on which the image is formed by the image forming unit, and a front end and a rear end of the recording medium to transport the inverted recording medium;
a recording medium width measuring unit configured to measure an end position of the recording medium in a width direction orthogonal to a transporting direction of the recording medium before and after the image is formed on the recording medium by the image forming unit; and
a recording medium length measuring unit configured to measure a length of the recording medium in the transporting direction of the recording medium;
a correcting unit configured to correct a size of an image to be formed on a subsequent recording medium by the image forming unit based on a change in a shape of the recording medium computed based on a measured result obtained by the recording medium width measuring unit and a measured result obtained by the recording medium length measuring unit; and
a resist unit disposed upstream of the recording medium width measuring unit and the recording medium length measuring unit in the transporting path of the recording medium, and configured to correct a transporting direction of the recording medium and transport the corrected recording medium at a time at which the image forming unit forms the image on the recording medium,
wherein the recording medium width measuring unit measures the end position of the recording medium in the width direction at a measuring position having an approximately identical distance from one end of the recording medium in the transporting direction of the recording medium before and after the image is formed on the recording medium by the image forming unit,
wherein the recording medium length measuring unit includes a recording medium transport unit configured to transport the recording medium, and
wherein the recording medium length measuring unit configured to measure the length in the transporting direction of the recording medium, the recording medium width measuring unit, and the resist unit are arranged in this order from the downstream of the sheet transporting direction.

2. The image forming apparatus as claimed in claim 1, wherein
the recording medium width measuring unit measures the end position of the recording medium in the width direction at a plurality of different measuring positions in the transporting direction of the recording medium.

3. The image processing apparatus as claimed in claim 1, wherein
the recording medium width measuring unit includes at least one line sensor configured to detect the end position of the recording medium in the width direction orthogonal to the transporting direction of the recording medium.

4. The image forming apparatus as claimed in claim 1, wherein
the recording medium width measuring unit measures the end position of the recording medium in the width direction orthogonal to the transporting direction of the recording medium at the measuring position a plurality of times, and computes a mean of measured results of the end position as the end position of the recording medium in the width direction of the recording medium at the measuring position.

5. The image forming apparatus as claimed in claim 1, wherein the image forming unit includes a transfer unit configured to transfer an image formed on an image carrier to the recording medium, and
wherein the recording medium width measuring unit and the recording medium length measuring unit are disposed upstream of the transfer unit in a transporting path of the recording medium.

6. The image forming apparatus as claimed in claim 1, wherein the recording medium length measuring unit includes
a recording medium transport unit configured to transport the recording medium;
a transport amount measuring unit configured to measure a transport amount of the recording medium transported by the recording medium transport unit;
a downstream detector configured to detect the recording medium downstream of the recording medium transport unit in the transporting direction of the recording medium;
an upstream detector configured to detect the recording medium upstream of the recording medium transport unit in the transporting direction of the recording medium; and
a transport distance computing unit configured to compute a transport distance of the recording medium based on respective results obtained by the medium transport unit, the downstream detector, and the upstream detector.

7. The image forming apparatus as claimed in claim 6, wherein the recording medium length measuring unit computes the transport distance of the recording medium based on the transport amount of the recording medium measured by the transport amount measuring unit during an interval from a time at which the downstream detector detects the recording medium to a time at which the upstream detector detects the recording medium.

8. The image forming apparatus as claimed in claim 6, wherein the recording medium transport unit includes
a driving roller configured to be rotationally driven by receiving driving force; and
a driven roller configured to be rotationally driven by sandwiching the recording medium between the driving roller and the driven roller to transport the sandwiched recording medium.

9. The image forming apparatus as claimed in claim 1, wherein the recording medium length measuring unit includes a detector configured to detect an end of the recording medium when the recording medium passes through the detector in the transporting direction of the recording medium,
wherein the recording medium length measuring unit is configured to measure the length of the recording medium in the transporting direction, based on an interval between a time at which the detector detects a front end of the recording medium in the transporting direction of the recording medium to a time at which the detector detects a rear end of the recording medium in the transporting direction of the recording medium, and a transporting velocity of the recording medium transported by the transport unit.

10. The image forming apparatus as claimed in claim 1, wherein the recording width measuring unit measures a width of the recording medium after a first predetermined time has elapsed and a second predetermined time has elapsed from a time at which the recording medium length measuring unit has detected the front end of the recording medium in the transporting direction, wherein a first distance is defined as a distance from the front end of the recording medium in the transporting direction to a width measuring position after the first predetermined time has elapsed from a time at which the recording medium length measuring unit has detected the front end of the recording medium in the transporting direction, and a second distance is defined as a distance from the front end of the recording medium in the transporting direction to a width measuring position after the second predetermined time has elapsed, and wherein the first and second predetermined times are set such that a total value of the first and second distances approximately equals the a length of the recording medium in the transporting direction.

11. The image forming apparatus as claimed in claim 10, wherein the recording width measuring unit measures the width of the recording medium prior to an image being formed on the first surface of the recording medium at a first width measuring position having the first distance, and a second width measuring position having the second distance, respectively, from the front end of the recording medium in the transporting direction, and wherein, after the width of the recording medium is measured after the image is formed on the first surface, the recording medium is inverted, and before an image is formed on the second surface, the recording width measuring unit measures the width of the recording medium at a third width measuring position having the first distance, and a fourth width measuring position having the second distance, respectively, from the front end of the recording medium in the transporting direction, the second width measuring position corresponding to the third width measuring position before image formation, and the fourth width measuring position corresponds to the first width measuring position before image formation.

* * * * *